(12) United States Patent
Noritake et al.

(10) Patent No.: US 6,504,593 B1
(45) Date of Patent: Jan. 7, 2003

(54) DISPLAY ELECTRODE ARRANGEMENT FOR A REFLECTION TYPE LIQUID CRYSTAL DISPLAY DEVICE

(75) Inventors: Kazuto Noritake, Gifu (JP); Keiichi Sano, Gifu (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 09/615,453

(22) Filed: Jul. 13, 2000

(30) Foreign Application Priority Data

Jul. 14, 1999 (JP) .......................................... 11-200598

(51) Int. Cl.⁷ ....................... G02F 1/1343; G02F 1/136; G02F 1/1335
(52) U.S. Cl. ........................... 349/139; 349/42; 349/43; 349/113
(58) Field of Search ............................... 349/38, 42, 43, 349/39, 139, 113

(56) References Cited

U.S. PATENT DOCUMENTS

| | | | |
|---|---|---|---|
| 5,548,153 A | 8/1996 | Muragishi | 257/365 |
| 5,644,146 A | 7/1997 | Arai et al. | 257/66 |
| 5,754,261 A | 5/1998 | Lyu | 349/44 |
| 5,796,116 A | 8/1998 | Nakata et al. | 257/66 |
| 5,834,797 A | 11/1998 | Yamanaka | 257/57 |
| 5,946,058 A * | 8/1999 | Kamada et al. | 349/42 |
| 5,955,765 A | 9/1999 | Yamazaki et al. | 257/365 |
| 5,965,916 A | 10/1999 | Chen | 257/347 |
| 5,966,193 A | 10/1999 | Zhang et al. | 349/110 |
| 6,034,747 A | 3/2000 | Tanaka et al. | 349/43 |
| 6,226,057 B1 * | 5/2001 | Lee | 349/38 |

FOREIGN PATENT DOCUMENTS

JP         11119255        4/1999

* cited by examiner

Primary Examiner—William L. Sikes
Assistant Examiner—Tarifur R. Chowdhury
(74) Attorney, Agent, or Firm—Cantor Colburn LLP (57) ABSTRACT

An insulator substrate (10) is provided with a TFT including a first gate electrode (11), a gate insulating film (12), a semiconductor film (13) disposed above the first gate electrode (11), and an interlayer insulating film (15). On the interlayer insulating film (15) in a position above a channel (13c), the TFT further includes a second gate electrode (17) connected to the first gate electrode (11). A reflective display electrode (20) composed of a reflective material and connected to a source (13s) of the TFT is arranged to extend over the TFT. In addition, the gap (37) between adjacent reflective display electrodes (20) is arranged in a position other than a position above a drain signal line (52). With this arrangement, even when a black image is displayed on a crystal display device of a normally white mode, display defects due to reflection of incident light by a signal line are prevented. Furthermore, a reflection type liquid crystal display device having a high aperture rate and minimal fluctuation in the TFT characteristics can be achieved.

13 Claims, 5 Drawing Sheets

DISPLAY ELECTRODE ARRANGEMENT FOR A REFLECTION TYPE LIQUID CRYSTAL DISPLAY DEVICE

BACKGROUND OF THE INVENTION

1. Field of the Invention

The present invention relates to a reflection type liquid crystal display device of a normally white mode, which employs a thin film transistor (referred to hereinafter as TFT) and a reflective display electrode connected to the TFT.

2. Description of the Related Art

In recent years, effort has been directed towards research and development of a reflection type liquid crystal display device with a reflective display electrode in which an image is displayed by reflecting incident light from the observer side.

A reflection type liquid crystal display device of a normally white mode using a conventional TFT is described below.

In the present application, a "normally" white mode refers to the liquid crystal orientation mode in which light is transmitted when no voltage is applied to the liquid crystal.

A reflection type liquid crystal display device is a display device in which an image is displayed by reflecting incident light from the observer side with a reflective display electrode.

Figure 1:
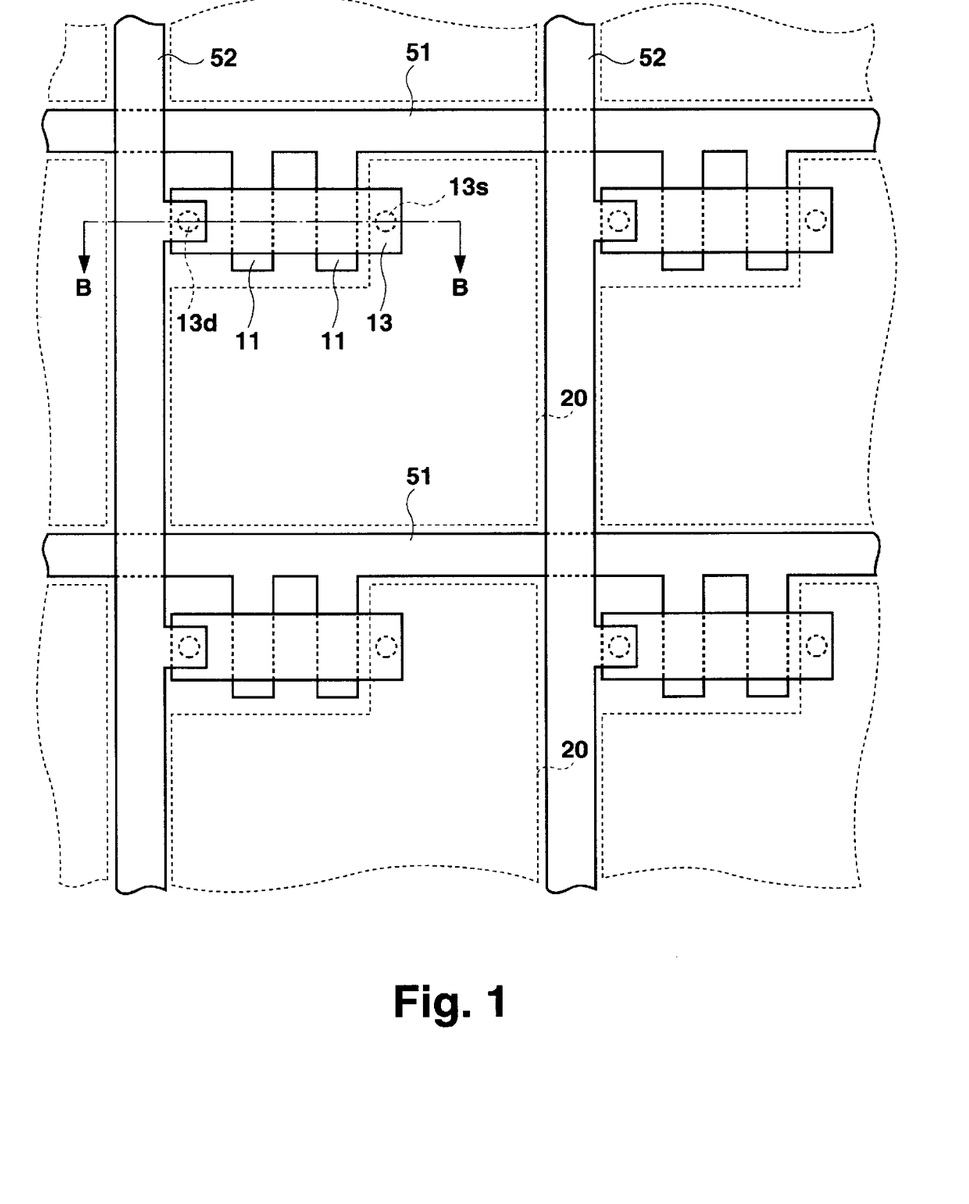
FIG. 1 is a plan view showing an area around a display pixel region of a conventional reflection type liquid crystal display device.
Figure 2:
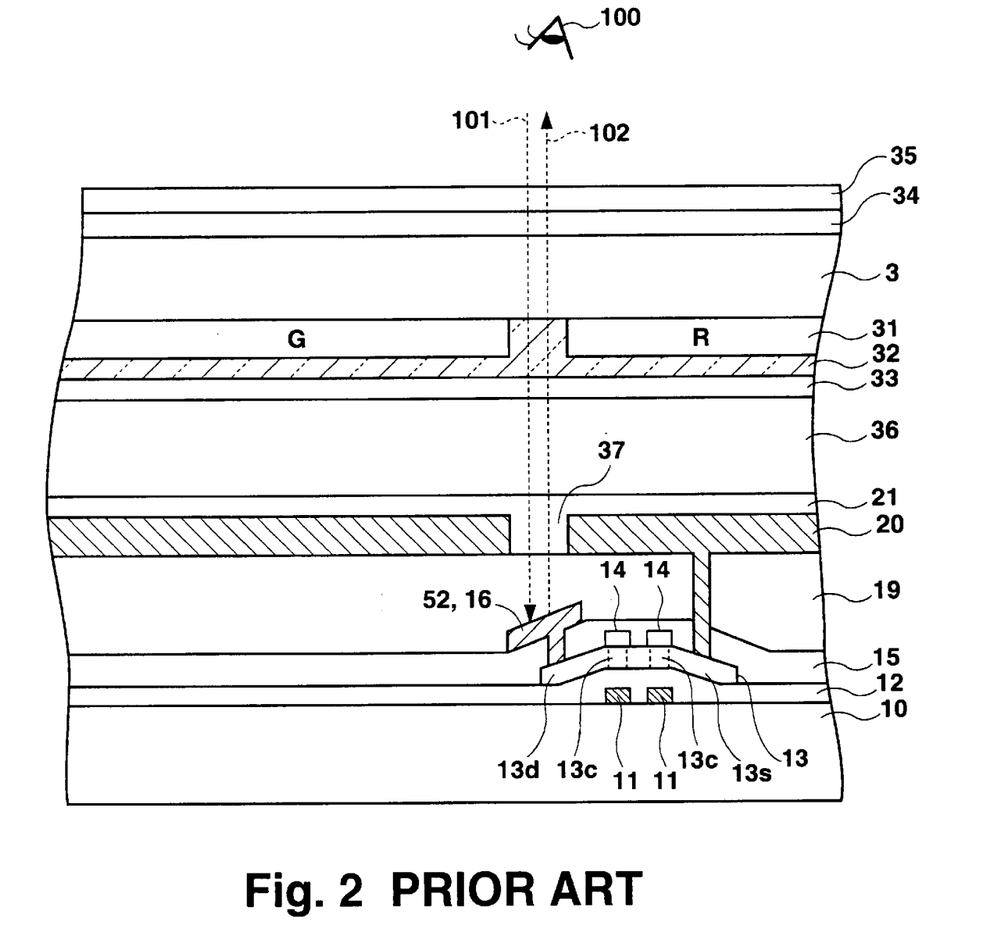
FIG. 2 is a cross-sectional view showing an area around a display pixel region of the conventional reflection type liquid crystal display device.

FIG. 1 is a plan view showing an area around a display pixel region in a conventional reflection type liquid crystal display device. FIG. 2 is a cross-sectional view taken along line B—B in FIG. 1.

As shown in FIG. 1, a gate signal line 51 which includes gate electrodes 11 in portions thereof is provided for supplying a gate signal to a gate. A drain signal line (data signal line) 52 which includes drain electrodes 16 in portions thereof is provided for supplying a drain signal to a drain. A TFT is provided near an intersection of the gate signal line and the drain signal line. In the TFT, the gate 11 is connected to the gate signal line 51, the drain 13d is connected to the drain signal line 52, and the source 13s is connected to a reflective display electrode 20.

As shown in FIGS. 1 and 2, sequentially provided on an insulator substrate 10 made of a material such as quartz glass or non-alkali glass are first gate electrodes 11 composed of a refractory metal such as Cr or Mo, a gate insulating film 12 composed of an SiN film and $SiO_2$ film, and an active layer 13 formed with poly-silicon film in discrete island patterns.

The active layer 13 includes channels 13c provided above the first gate electrodes 11. The active layer 13 further includes a source 13s and a drain 13d formed by ion doping on the respective sides of the channels 13c.

A stopper insulating film 14 made of $SiO_2$ film is provided over the channels 13c to function as the mask covering the channels 13c such that ions do not enter into the channels 13c during ion doping.

Furthermore, an interlayer insulating film 15 is formed on the entire surface over the gate insulating film 12, the active layer 13, and the stopper insulating film 14, by sequential lamination of a $SiO_2$ film, a SiN film, and a $SiO_2$ film.

A contact hole formed in the interlayer insulating film 15 in a position corresponding to the drain 13d is filled with metal sing Al only, or by sequentially depositing Mo and Al, to thereby form a drain electrode 16.

The drain signal line 52 is disposed on the interlayer insulating film 15. Furthermore, a planarizing insulating film 19 made of a material such as an organic resin is provided on the entire surface.

As shown in FIG. 2, a contact hole is formed in the planarizing insulating film 19 in a position corresponding to the source 13s. A reflective display electrode 20 that contacts the source 13s through this contact hole is formed using a reflective and conductive material such as Al. The reflective display electrode 20 simultaneously serves as a source electrode. An alignment layer 21 for orienting the liquid crystal 36 is provided further on top.

A counter electrode substrate 30 has, on the side facing the insulator substrate 10 and the liquid crystal 36, color filters 31 for each of red (R), green (G), and blue (B), a counter electrode 32, and an alignment layer 33. Provided on the other side of the substrate 30 are a retardation film 34 and a polarizer 35. The insulator substrate 10 provided with TFTs in the above-described manner and the counter electrode substrate 30 are sealed by surrounding the substrates with a sealing adhesive. The gap created between the two substrates is then filled with liquid crystal 36 to complete the liquid crystal display device.

According to a conventional reflection type liquid crystal display device such as that described above, the reflective display electrodes 20 are arranged such that the gaps between adjacent electrodes 20 lie above the gate signal lines 51 and the drain signal lines 52, as shown in FIG. 1. In the example of FIG. 2, referring to a drain signal line 52 having drain electrodes as portions thereof, a gap between adjacent reflective display electrodes 20 is arranged above the drain signal line 52.

In this arrangement, incident light 101 from a light source (the side of an observer 100) transmits through the polarizer 35, the retardation film 34, the counter electrode substrate 30, the alignment layer 33, the liquid crystal 36, the alignment layer 21, and the planarizing insulating film 19 to reach the drain signal line 52. The incident light 101 is then reflected by the drain signal line 52 through a reverse path, namely, the path indicated by a dotted line 102, to radiate out of the polarizer 35. More specifically, incident light 101 entering through the abovementioned path is reflected by the drain signal line 52 composed of Al having a reflectance of approximately 95% or more, and reflected light 102 is therefore constantly observed by the observer 100.

In this way, a conventional reflective liquid crystal display device of a normally white mode is disadvantageous in that, even when a black image is displayed, the reflected light 102 generates display defects in the form of white lines along the drain signal lines 52, thereby decreasing contrast.

A further disadvantage is that the aperture ratio is small because the reflective display electrodes 20 are not formed in areas in which the TFTs are provided.

SUMMARY OF THE INVENTION

The present invention was created in light of the above problems. The purpose of the present invention is to provide a reflection type liquid crystal display device of a normally white mode having a high aperture ratio, in which generation of display defects due to reflection of incident light by signal lines is prevented when a black image is displayed on the device.

The reflection type liquid crystal display device according to the present invention is a reflection type liquid crystal display device of a normally white mode comprising a substrate having a gate signal line and a data signal line arranged to intersect one another, and a plurality of display pixel regions defined by the gate signal line and the data signal line. Each display pixel region includes a thin film transistor connected to the gate signal line and the data signal line, and a reflective display electrode connected to the thin film transistor. The reflective display electrode covers an area in which the thin film transistor is formed, and extends into an adjacent display pixel region located beyond the gate signal line. A gap between the reflective display electrodes in the display pixel regions located adjacent to one another on either side of the gate signal line is positioned in an offset arrangement from the position in which the gate signal line is formed.

In another aspect, the reflection type liquid crystal display device according to the present invention is a reflection type liquid crystal display device of a normally white mode comprising a substrate having a gate signal line and a data signal line arranged to intersect one another, and a plurality of display pixel regions defined by the gate signal line and the data signal line, each display pixel region including a thin film transistor connected to the gate signal line and the data signal line, and a reflective display electrode connected to the thin film transistor, wherein the reflective display electrode covers an area in which the thin film transistor is formed, and extends into an adjacent display pixel region located beyond the data signal line. A gap between the reflective display electrodes in the display pixel regions located adjacent to one another on either side of the data signal line is positioned in an offset arrangement from the position in which the data signal line is formed.

In a further aspect of the present invention, the reflective display electrode covers an area in which the thin film transistor is formed, and extends into an adjacent display pixel region located beyond the gate signal line, while a gap between the reflective display electrodes in the display pixel regions located adjacent to one another on either side of the gate signal line is positioned in an offset arrangement from the position in which the gate signal line is formed, and, at the same time, the reflective display electrode also extends into an adjacent display pixel region located beyond the data signal line. The gap between the reflective display electrodes in the display pixel regions located adjacent to one another on either side of the data signal line is positioned in an offset arrangement from the position in which the data signal line is formed.

In a still further aspect of the present invention, the thin film transistor comprises a first gate electrode constituting an integral portion of the gate signal line, a semiconductor film including a first insulating film, a channel, a source, and a drain, and a second insulating film. On the second insulating film, a second gate electrode is formed so as to cover the area over the channel.

In another aspect of the present invention, the second gate electrode is connected to the first gate electrode.

In a further aspect of the present invention, the thin film transistor comprises a plurality of first gate electrodes constituting integral portions of the gate signal line, a first insulating film, a semiconductor film extending so as to intersect said plurality of first gate electrodes and including channels formed in positions overlapping each of said plurality of first gate electrodes, a second insulating film, and a second gate electrodes formed on the second insulating film so as to cover over an area in which the channel is formed.

As described above, a gap between reflective display electrodes in adjacent display pixel regions is positioned in an offset arrangement from the position of a gate signal line and/or, data-line which is often composed of a conductive material having a high reflectance. In this way, when displaying a black image on the reflection type display device of a normally white mode, generation of display defects showing white lines along the signal lines caused by the reflection of incident light by the signal lines can be prevented. Accordingly, a reflection type display device having high contrast and a high aperture rate can be achieved.

Further, by configuring the thin film transistor with a first gate electrode and a second gate electrode sandwiching a semiconductor film having insulating films and a channel, influence of the electric field generated by reflective display electrode for the channel can be reliably prevented, accomplishing a display device having minimal fluctuation in the characteristics of the thin film transistors.

Still further, the width of the second gate electrode in the channel length direction is made narrower than the width of the first gate electrode in the same channel length direction. With to this arrangement, the effective channel length is prevented from becoming longer than the target channel length due to mask misalignment or other causes-during fabrication of the thin film transistor. In addition, generation of leak current in the semiconductor film is prevented, which may otherwise be caused when the peripheral portions of the second gate electrode overlap the channel end portions. In this way, the structure of the present invention minimizes variance of display characteristics in each display region and each display device.

DESCRIPTION OF THE PREFERRED EMBODIMENT

A preferred embodiment of a reflection type liquid crystal display device according to the present invention is next described.

Figure 3:
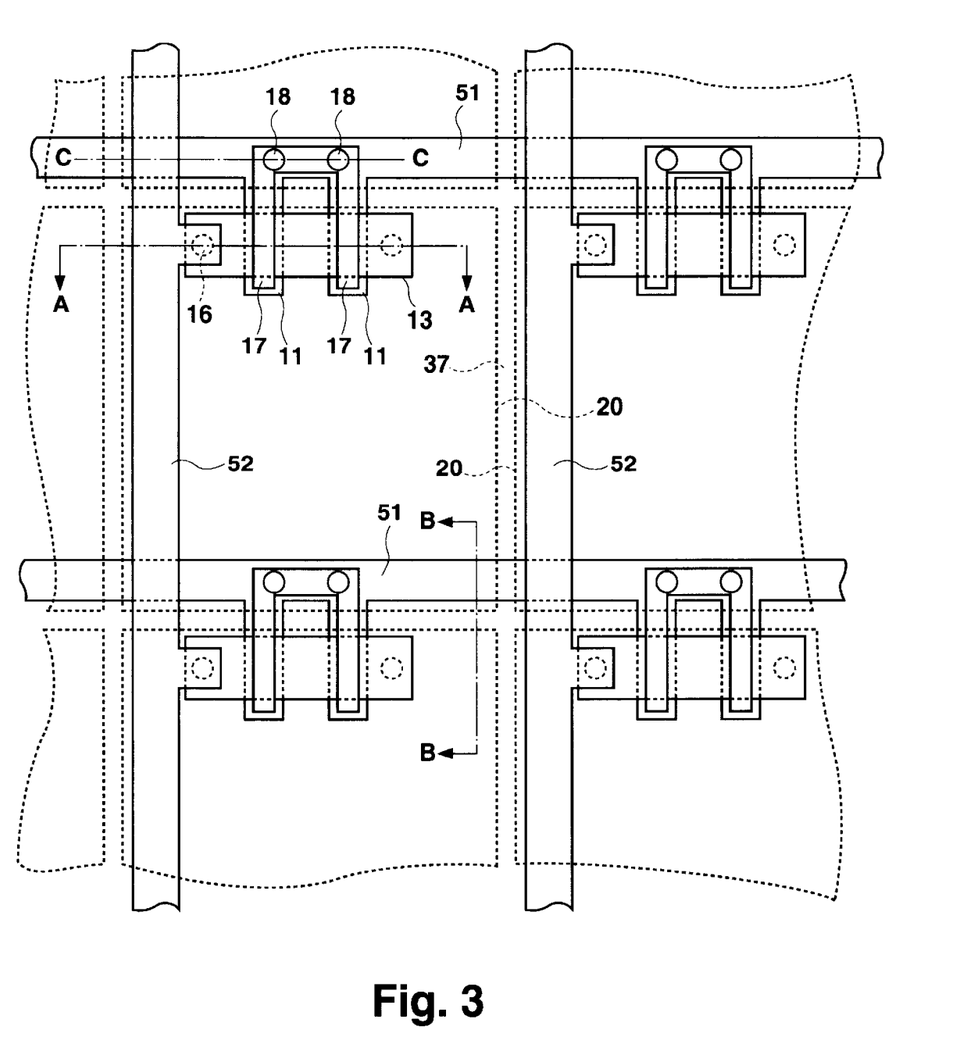
FIG. 3 is a plan view showing an area around a display pixel region of a reflection type liquid crystal display device according to a preferred embodiment of the present invention.
Figure 4:
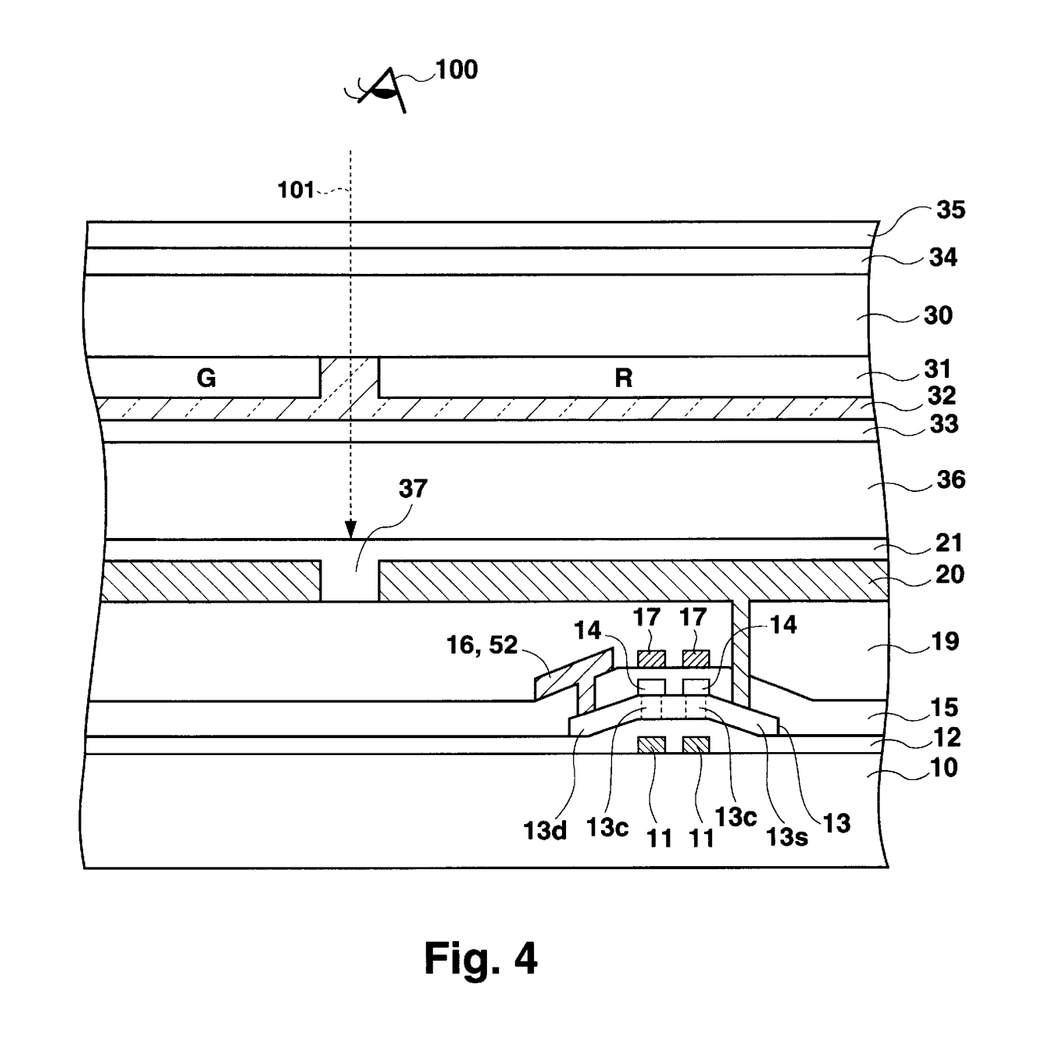
FIG. 4 is a cross-sectional view showing an area around a display pixel region of a reflection type liquid crystal display device according to the preferred embodiment of the present invention.
Figure 5:
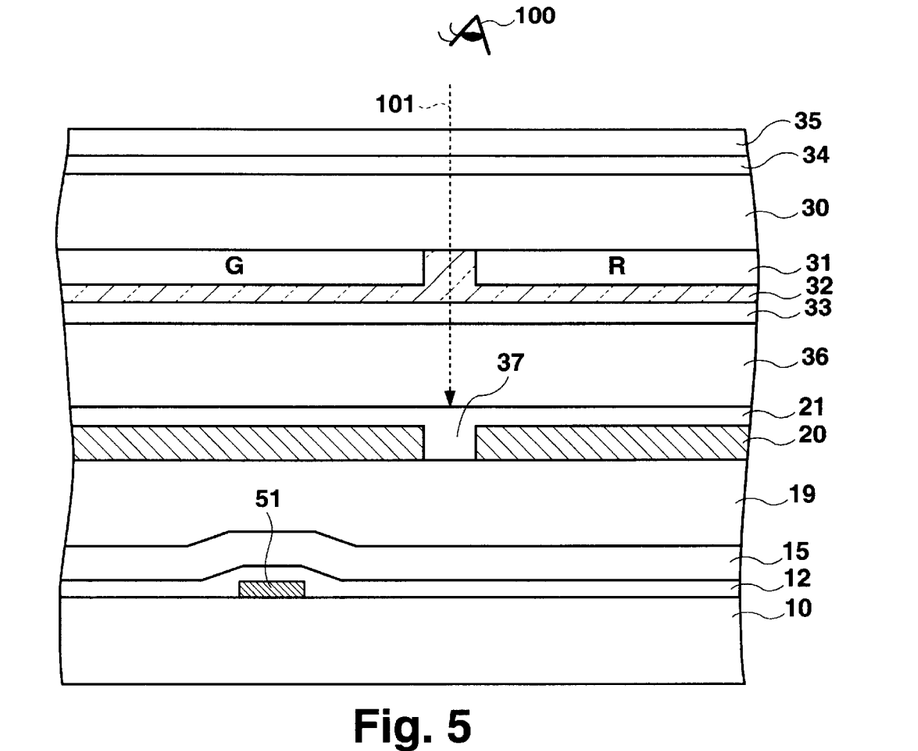
FIG. 5 is another cross-sectional view showing an area around a display pixel region of a reflection type liquid crystal display device according to the preferred embodiment of the present invention.

FIG. 3 is a plan view showing an area around a display pixel region of a reflection type liquid crystal display device according to the embodiment of the present invention. FIG. 4 is a cross-sectional view of the liquid crystal display device taken along line A—A in FIG. 3. FIG. 5 is a cross-sectional view taken along line B—B in FIG. 3. FIG.

Figure 6:
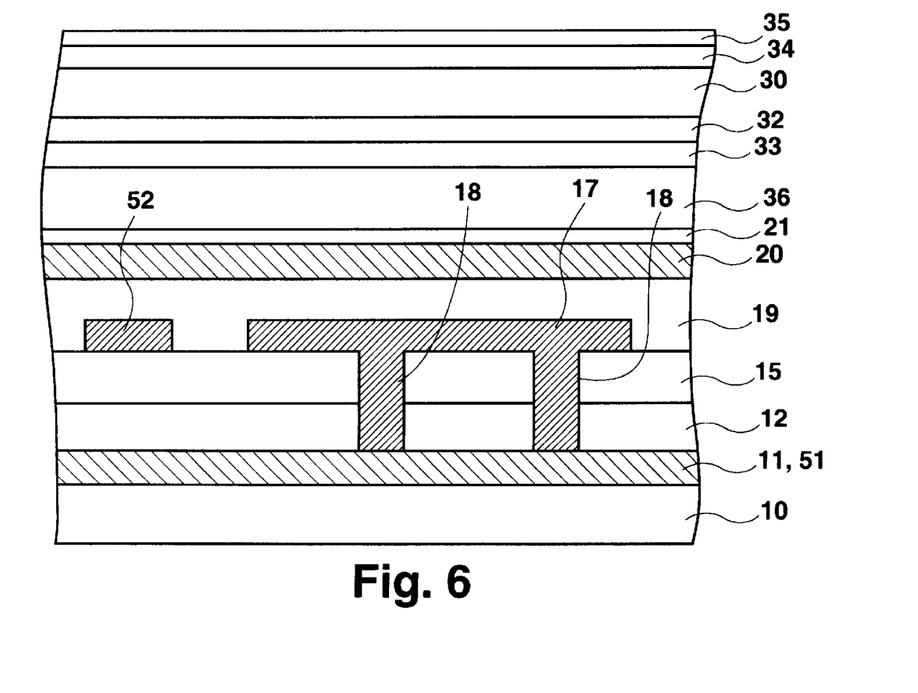
FIG. 6 is a further cross-sectional view showing an area around a display pixel region of a reflection type liquid crystal display device according to the preferred embodiment of the present invention.

6 is a cross-sectional view of the reflection type liquid crystal display device taken along line C—C in FIG. 3.

As shown in FIG. 3, a TFT is disposed near an intersection of a gate signal line 51 including first gate electrodes 11 in portions thereof and a drain signal line 52 including drain electrodes 16 in portions thereof. The TFT is connected to a reflective display electrode 20 composed of a reflective material. The reflective display electrode 20 is arranged to extend over the TFT, as indicated by dotted lines in FIG. 3.

As shown in FIG. 4, sequentially provided on an insulator substrate 10 made of a material such as quartz glass or non-alkali glass are first gate electrodes 11 composed of a refractory metal such as Cr or Mo, a gate insulating film 12 composed of an SiN film and $SiO_2$ film, and an active layer 13 formed using a poly-silicon film.

The active layer 13 includes channels 13c provided above the first gate electrodes 11. The active layer 13 further includes a source 13s and a drain 13d formed by ion doping on the respective sides of the channels 13c.

A stopper insulating film 14 made of an $SiO_2$ film is provided over the channels 13c to function as the mask covering the channels 13c such that ions do not enter into the channels 13c during the ion doping for forming the source 13s and the drain 13d.

Furthermore, an interlayer insulating film 15 is formed on the entire surface over the gate insulating film 12, the active layer 13, and the stopper insulating film 14. The interlayer insulating film 15 may be a single material organic film composed of an organic material such as $SiO_2$, SiN, or acrylic material, or alternatively, a multi-layer composed of a combination of any of those materials.

Subsequently, a contact hole formed in the interlayer insulating film 15 in a position corresponding to the drain 13d is filled with metal by using Al only or by sequentially depositing Mo and Al, to thereby form a drain electrode 16. At the same time of forming the drain electrode 16, second gate electrodes 17 are formed on the interlayer insulating film 15 in the position above the channels 13c. In other words, metal second gate electrodes 17 formed using Al only or using a sequential deposit of Mo and Al are provided.

As shown in FIG. 6, the second gate electrodes 17 disposed on the interlayer insulating film 15 are connected to the gate signal wiring line 51 on the insulator substrate 10 via a contact hole 18 created in the gate insulating film 12 and the interlayer insulating film 15. The drain signal line 52 is disposed on the interlayer insulating film 15. Furthermore, a planarizing insulating film 19 made of a material such as an organic resin is provided on the entire surface.

As shown in FIG. 4, a contact hole is formed in the planarizing insulating film 19 in a position corresponding to the source 13s. A reflective display electrode 20 that contacts the source 13s through this contact hole is formed using a reflective and conductive material such as Al. The reflective display electrode 20 simultaneously serves as a source electrode. An alignment layer 21 for orienting the liquid crystal 36 is provided further on top.

The insulator substrate 10 provided with TFTs in the above-described manner and the counter electrode substrate 30 having a counter electrode 30 and an alignment layer 32 facing the insulator substrate 10 are sealed by surrounding the substrates with a sealing adhesive. The gap created between the two substrates is then filled with liquid crystal 36 to complete the liquid crystal display device.

The reflective display electrode 20 formed on the planarizing insulating film 19 is next described in detail.

The positional relationship between the gap 37 between adjacent reflective display electrodes 20 and the drain signal line 52 is next explained.

The reflective display electrodes 20 are disposed as shown in FIGS. 3 and 4. The gap (space) 37 between the reflective display electrodes 20 is prevented from overlapping the drain signal line 52 by being shifted from the position in which the signal line 52 is formed.

With this arrangement, the incident light 101 originating from the side of the observer 100 transmits through the polarizer 35, retardation film 34, the counter electrode substrate 30, the alignment layer 33, the liquid crystal 36, and the alignment layer 21, to pass through the gap 37. The transmitted light thus reaches the planarizing insulating film 19 and the interlayer insulating film 15.

In this way, the incident light 101 from the observer 100 side irradiates the insulating films after passing through the layers and the gap 37. As the insulating films have a reflectance of 1% or less, the incident light 101 is almost completely absorbed and is not reflected back to the observer 100.

Accordingly, even when a black image is displayed on the reflection type liquid crystal display device of a normally white mode, no display defects in the form of white lines along the drain signal line 52 are generated.

The positional relationship between the gap 37 between adjacent reflective display electrodes 20 and the gate signal line 51 is next explained.

As shown in FIGS. 3 and 5, the gap 37 between the reflective display electrodes 20 is prevented from being positioned above the gate signal line 51. In other words, the gap 37 is arranged such that the gate electrode 51, which would reflect the incident light 101, is not located under the gap 37, and only the planarizing insulating film 19 and the interlayer insulating film 15 are positioned below the gap 37.

With such an arrangement, the incident light 101 is prevented from being reflected by the gate signal line 51 as occurs in a conventional device. Even when a black image is displayed on the reflection type liquid crystal display device of a normally white mode, no white lines are visible along the signal line no incident light is reflected by the signal line.

By avoiding arranging the gap between adjacent reflective display electrodes 20 above the signal lines 51,52 in the manner described above, the incident light 101 from the observer 100 side is prevented from being reflected by the signal lines 51,52, such that the reflected light 102 is not visible to the observer 100. In this way, when a black image is displayed on the reflection type liquid crystal display device of a normally white mode, display defects in the form of white lines along the signal lines are not generated.

According to the above-described structure wherein a second gate electrode 17 is positioned over a channel 13c and connected to a first gate electrode 11, and a reflective display electrode 20 extends over the TFT, adhesion of impurities to the surface of the interlayer insulating film can be prevented. This in turn prevents accumulation of electric charges on the surface of the interlayer insulating film, allowing fabrication of TFTs having a stable threshold voltage. In this way, defects such as bright spots can be reduced, and a display image having a uniform luminance over the entire screen can be achieved. Furthermore, a liquid crystal display device having a high aperture rate can be accomplished.

While the gap 37 between the reflective display electrodes 20 is prevented from overlapping each of the gate signal line 51 and the drain signal line 52 in the present embodiment, the gap 37 may also be arranged to avoid overlapping only one of the gate 20 signal line 51 and the drain signal line 52. Preferably, the gap 37 is positioned over neither of the signal lines 51, 52.

In the present invention, a reflective display electrode 20 extends into adjacent display pixel regions. Adjacent display pixel regions are defined as the display pixel regions surrounding one particular display pixel region in the vertical, horizontal, and diagonal directions. When a reflective display electrode 20 overlaps a gate signal line as shown in FIG. 3, from among the nth and n+1th gate signal lines 51 adjacently located on the upper and lower sides, the reflective display electrode 20 preferably overlaps the gate signal line for the subsequent n+1th row, rather than the nth gate signal line to which the electrode 20 is connected. By this arrangement, the influence on the reflective display electrode 20 by the voltage applied to gate signal lines can be suppressed. Specifically, in general, gate signal lines are sequentially selected from the ones located near the top of the screen (in the order of n−1th, nth, and n+1th) to be applied with a gate voltage. A display signal voltage is applied to each of the reflective display electrodes connected to the nth gate signal line when the nth gate signal line is selected. Accordingly, if the nth gate signal line and a corresponding reflective display electrode 20 are positioned in an overlap, there is a possibility that the application of the display signal to the electrode 20 becomes deficient. However, this problem is avoided if the electrode 20 corresponding to the nth gate signal line overlaps the n+1th gate signal line because, when the display signal voltage is applied to the electrode 20, no gate voltage is applied to the n+1th gate signal line.

In the above-described preferred embodiment of the present invention, the second gate electrode 17 is disposed on the interlayer insulating film 15. The width of the second gate electrode 17 is smaller than the channel length of each channel 25 13c and the width of the gate electrode 11, such that the second gate electrode 17 does not overlap the end portions of the channel 13c and the gate electrode 11. Alternatively, the present invention may be configured such that the width of the second gate electrode 17 is wider than the width of the gate electrode 11. In a double gate structure, both of the first gate electrodes 11 may be covered with the second gate electrodes 17.

In a double gate structure having two first gate electrodes 11, the second gate electrode 17 may be disposed on only one of the first gate electrodes 11.

The same advantages can be accomplished by disposing the second gate electrode 17 on the planarizing insulating film 19 instead of the interlayer insulating film 15.

Furthermore, each of the insulating films provided between the second gate electrode 17 and the active layer 13, which may be the stopper insulating film 14, the interlayer insulating film 15, and the planarizing insulating film 19 of the present embodiment, may be composed of a single material film such as an $SiO_2$ film, an SiN film, or an organic film, or alternatively, composed of a lamination of those films.

Although a TFT having two gates, namely, a double gate electrode structure, was illustrated in the present embodiment, the TFT structure may also be a single gate structure including one gate, or a multi-gate structure including three or more gates.

What is claimed is:
1. A reflection type liquid crystal display device of a normally white mode, having a substrate provided with a gate signal line and a data signal line arranged to intersect one another, and a plurality of display pixel regions defined by the gate signal line and the data signal line, each of the plurality of display pixel regions including:
   a thin film transistor connected to said gate signal line and said data signal line; and
   a reflective display electrode connected to said thin film transistor; wherein
   said reflective display electrode covers an area in which said thin film transistor is formed, and extends into an adjacent display pixel region located beyond said gate signal line; and
   a gap between the reflective display electrodes in the display pixel, regions located adjacent to one another on either side of said gate signal line is positioned in an offset arrangement from a position in which said gate signal line is formed and to not overlap a position in which any other conductive line extending parallel to the gate signal line is formed.

2. A reflection type liquid crystal display device as defined in claim 1, wherein
   said reflective display electrode extends into an adjacent display pixel region located beyond said data signal line; and
   a gap between the reflective display electrodes in the display pixel regions located adjacent to one another on either side of said data signal line is positioned in an offset arrangement from a position in which said data signal line is formed.

3. A reflection type liquid crystal display device as defined in claim 1, wherein
   said thin film transistor comprises:
      a first gate electrode constituting an integral portion of said gate signal line;
      a semiconductor film including a first insulating film, a channel, a source, and a drain;
      a second insulating film; and
      a second gate electrode formed on said second insulating film so as to cover an area over said channel.

4. A reflection type liquid crystal display device as defined in claim 3, wherein
   said second gate electrode is connected to said first gate electrode.

5. A reflection type liquid crystal display device as defined in claim 3, wherein
   a width of said second gate electrode in a channel length direction is narrower than a width of said first gate electrode in the channel length direction.

6. A reflection type liquid crystal display device as defined in claim 1, wherein
   said thin film transistor comprises:
      a plurality of first gate electrodes constituting integral portions of said gate signal line;
      a first insulating film;
      a semiconductor film extending so as to intersect said plurality of first gate electrodes and including channels formed in positions overlapping each of said plurality of first gate electrodes;
      a second insulating film; and
      a second gate electrode formed on said second insulating film so as to cover an area over said channel.

7. A reflection type liquid crystal display device as defined in claim 6, wherein
   a width of said second gate electrode in a channel length direction is narrower than a width of said first gate electrode in the channel length direction.

8. A reflection type liquid crystal display device of a normally white mode, having a substrate provided with a gate signal line and a data signal line arranged to intersect one another, and a plurality of display pixel regions defined by the gate signal line and the data signal line, each of the plurality of display pixel regions including:

a thin film transistor connected to said gate signal line and said data signal line; and a reflective display electrode connected to said thin film transistor; wherein said reflective display electrode is formed respectively on a same layer at said plurality of display pixel regions so that it covers an area in which said thin film transistor is formed, and extends into an adjacent display pixel region located beyond said data signal line; and a gap between the reflective display electrodes in the display pixel regions located adjacent to one another on either side of said data signal line is positioned in an offset arrangement from a position in which said data signal line is formed.

9. A reflection type liquid crystal display device as defined in claim 8, wherein said thin film transistor comprises:

a first gate electrode constituting an integral portion of said gate signal line;

a semiconductor film including a first insulating film, a channel, a source, and a drain;

a second insulating film; and a second gate electrode formed on said second insulating film so as to cover an area over said channel.

10. A reflection type liquid crystal display device as defined in claim 9, wherein said second gate electrode is connected to said first gate electrode.

11. A reflection type liquid crystal display device as defined in claim 9, wherein a width of said second gate electrode in a channel length direction is narrower than a width of said first gate electrode in the channel length direction.

12. A reflection type liquid crystal display device as defined in claim 8, wherein said thin film transistor comprises:

a plurality of first gate electrodes constituting integral portions of said gate signal line:

a first insulating film;

a semiconductor film extending so as to intersect said plurality of first gate electrodes and including channels formed in positions overlapping each of said plurality of first gate electrodes;

a second insulating film; and a second gate electrode formed on said second insulating film so as to cover an area over said channel.

13. A reflection type liquid crystal display device as defined in claim 12, wherein a width of said second gate electrode in a channel length direction is narrower than a width of said first gate electrode in the channel length direction.

* * * * *